United States Patent
Jiang et al.

(10) Patent No.: US 10,279,816 B2
(45) Date of Patent: May 7, 2019

(54) METHOD AND APPARATUS FOR MONITORING AN ON-VEHICLE CONTROLLER

(71) Applicant: GM GLOBAL TECHNOLOGY OPERATIONS LLC, Detroit, MI (US)

(72) Inventors: Shengbing Jiang, Rochester Hills, MI (US); Sandeep U. Menon, Rochester Hills, MI (US); James K. Thomas, Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 74 days.

(21) Appl. No.: 15/451,908

(22) Filed: Mar. 7, 2017

(65) Prior Publication Data

US 2018/0257663 A1  Sep. 13, 2018

(51) Int. Cl.
*B60W 50/04* (2006.01)
*B60W 50/02* (2012.01)
(Continued)

(52) U.S. Cl.
CPC ........ *B60W 50/04* (2013.01); *B60W 50/0205* (2013.01); *G05B 23/0275* (2013.01); *G06F 11/079* (2013.01); *G06F 11/3452* (2013.01); *G07C 5/0808* (2013.01); *B60W 2510/06* (2013.01); *B60W 2520/10* (2013.01); *B60W 2520/26* (2013.01); *B60W 2540/10* (2013.01);
(Continued)

(58) Field of Classification Search
CPC ............. G05B 23/0275; G06F 11/3447; G06F 11/3452; G06F 11/079; B60W 50/0205; B60W 50/021; B60W 50/04; B60W 50/045; G07C 5/0808; G07C 5/008
See application file for complete search history.

(56) References Cited

U.S. PATENT DOCUMENTS 5,041,976 A * 8/1991 Marko .................... F02D 41/22
                                                     701/102
6,073,089 A * 6/2000 Baker ................. G06F 11/0709
                                                     702/185
(Continued)

FOREIGN PATENT DOCUMENTS

JP         2006349430 A  * 12/2006

OTHER PUBLICATIONS

Kodali, Anuradha et al., "Fault diagnosis in automotive electric power generation and storage system (EPGS)", IEEE/ASME Transactions on Mechatronics, vol. 18 No. 6, Dec. 2013, pp. 1809 to 1818 (Year: 2013).*

(Continued)

*Primary Examiner* — Behrang Badii
*Assistant Examiner* — David A Testardi
(74) *Attorney, Agent, or Firm* — Quinn IP Law

(57) ABSTRACT

A method for monitoring a controller for a vehicle includes determining configuration information associated with the vehicle and determining vehicle operating states associated with a plurality of conditions. A statistical analysis is executed to correlate a plurality of faults with the vehicle operating states and the configuration information associated with the vehicle. The plurality of faults in the controller can be isolated to one of a hardware fault or a software fault based upon the statistical analysis and the configuration information associated with the vehicle.

17 Claims, 3 Drawing Sheets

(51) Int. Cl.
*G07C 5/08* (2006.01)
*G05B 23/02* (2006.01)
*G06F 11/34* (2006.01)
*G06F 11/07* (2006.01)

(52) U.S. Cl.
CPC ..... *B60W 2540/12* (2013.01); *B60W 2550/12* (2013.01); *B60W 2550/402* (2013.01)

(56) References Cited

U.S. PATENT DOCUMENTS

| | | | | |
|---|---|---|---|---|
| 6,128,555 | A * | 10/2000 | Hanson | B64G 1/24 244/158.1 |
| 7,260,501 | B2 * | 8/2007 | Pattipatti | G05B 23/0243 702/182 |
| 2005/0027480 | A1 * | 2/2005 | Qiao | G06F 11/2257 702/183 |
| 2005/0091642 | A1 * | 4/2005 | Miller | G06F 11/3664 717/124 |
| 2006/0064291 | A1 * | 3/2006 | Pattipatti | G05B 23/0243 703/14 |
| 2006/0101402 | A1 * | 5/2006 | Miller | G06F 11/3636 717/124 |
| 2006/0230313 | A1 * | 10/2006 | Grichnik | G05B 23/0254 714/26 |
| 2007/0028219 | A1 * | 2/2007 | Miller | G05B 23/021 717/124 |
| 2007/0028220 | A1 * | 2/2007 | Miller | G05B 23/0278 717/124 |
| 2007/0283188 | A1 * | 12/2007 | Balzer | B60W 50/0205 714/26 |
| 2008/0154459 | A1 * | 6/2008 | Grichnik | G06Q 10/06 701/29.4 |
| 2010/0161546 | A1 * | 6/2010 | Yamada | G06F 11/008 706/54 |
| 2012/0166878 | A1 * | 6/2012 | Sinha | G06F 11/079 714/37 |
| 2012/0232743 | A1 * | 9/2012 | Singh | G06Q 10/06 701/29.9 |
| 2012/0303348 | A1 * | 11/2012 | Lu | G05B 23/0235 703/13 |
| 2013/0136007 | A1 * | 5/2013 | Jiang | H04L 41/0677 370/242 |
| 2013/0159240 | A1 * | 6/2013 | Singh | G05B 23/0275 706/51 |
| 2014/0164826 | A1 * | 6/2014 | Aoki | G06F 11/0739 714/10 |

OTHER PUBLICATIONS

Wikipedia article, "On-board diagnostics", Old revision dated Sep. 1, 2015, 15 pages. (Year: 2015).*

JPO machine translation of JP 2006-349430 (original JP document published Dec. 28, 2006) (Year: 2006).*

* cited by examiner

METHOD AND APPARATUS FOR MONITORING AN ON-VEHICLE CONTROLLER

INTRODUCTION

Controllers employed on vehicles may experience faults.

SUMMARY

A controller for a vehicle is described. A method for monitoring the controller includes determining configuration information associated with the vehicle and determining vehicle operating states associated with a plurality of conditions. A statistical analysis is executed to correlate a plurality of faults with the vehicle operating states and the configuration information associated with the vehicle. The plurality of faults in the controller can be isolated to one of a hardware fault or a software fault based upon the statistical analysis and the configuration information associated with the vehicle.

An aspect of the disclosure includes determining a controller hardware configuration, a software update level, controller manufacturing site information, vehicle assembly site information, and a vehicle assembly date.

Another aspect of the disclosure includes determining vehicle operating states including occurrence of diagnostic trouble codes and associated fault reports.

Another aspect of the disclosure includes determining vehicle operating states including determining environmental states, wherein the environmental states include temperature, vibration, humidity, precipitation and geographic location.

Another aspect of the disclosure includes determining vehicle operating states including determining software execution states.

Another aspect of the disclosure includes the software execution states including a presence or occurrence of a mode change, a module triggering event, e.g., power-on or power-off events, or a function request.

Another aspect of the disclosure includes determining vehicle operating states that include odometer, speed, power mode, engine running status, steering wheel angle, accelerator pedal position, or brake pedal position.

Another aspect of the disclosure includes executing, via a controller, a statistical analysis to correlate the plurality of faults with the vehicle operating states associated with the plurality of conditions and the configuration information associated with the vehicle. This includes determining baseline and fault probability distributions for each of the conditions and determining a statistical distance based upon the baseline and fault probability distributions. Correlations between the conditions and the plurality of faults are determined based upon the statistical distance.

Another aspect of the disclosure includes executing a maximum likelihood estimation to determine the baseline and fault probability distributions.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the disclosure, as illustrated and described herein, may be practiced in the absence of an element that is not specifically disclosed herein.

Figure 1:
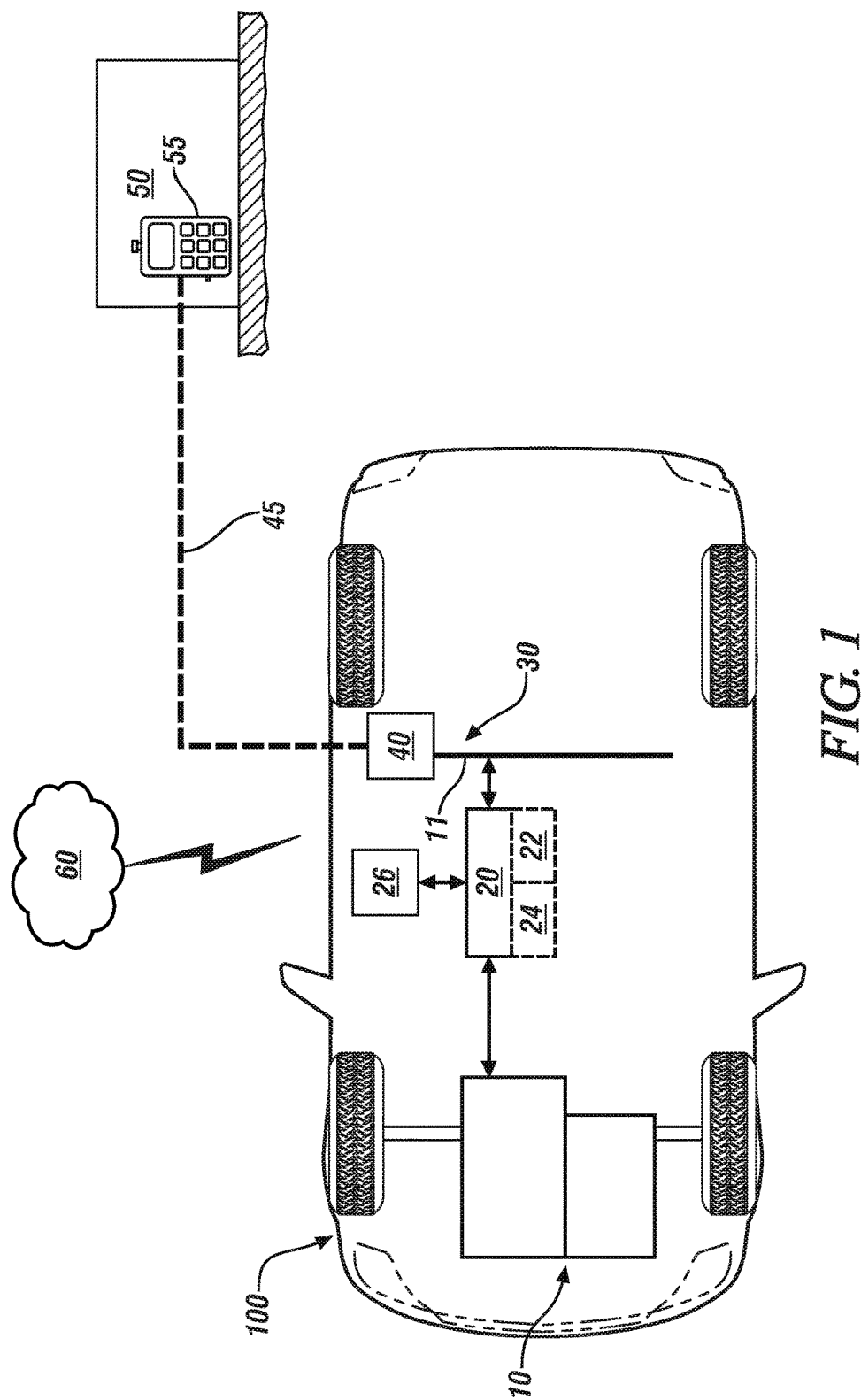
FIG. 1 schematically illustrates a vehicle employing a powertrain system that communicates with and is operatively controlled by a controller, in accordance with the disclosure.

Referring to the drawings, wherein like reference numerals correspond to like or similar components throughout the several Figures, FIG. 1, consistent with the embodiments disclosed herein, illustrates a vehicle 100 employing a powertrain system 10 that communicates with and is operatively controlled by a controller 20. The controller 20 includes one or more control routines in the form of executable algorithms 22 and calibrations 24 that are disposed to control one or more vehicle operations.

The controller 20 is in communication with a controller-area network (or CAN) 30, which includes a communication bus 11 and a communication controller 40. The communication controller 40 preferably includes devices and routines capable of wirelessly communicating with a cloud computing environment 60, such as a wireless telematics communications system capable of wireless communications. The communication controller 40 preferably also includes devices and routines for communicating via a datalink 45 with a scan tool 55, such as may be available at a vehicle service center 50. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The powertrain system 10 may be a suitable configuration that includes one or a plurality of torque-generating devices, geartrains and driveline devices that can generate and transfer propulsion power to one or a plurality of ground wheels to effect propulsion.

A user interface 26 is arranged to discern user commands related to vehicle operation, which are communicated to the controller 20. The user interface 26 includes a plurality of devices that allow a user to interact with the vehicle 100 to command and control its operation, including controlling operation of elements of the powertrain system 10. Such devices may include by way of non-limiting examples, an accelerator pedal, a brake pedal, a transmission range selector lever, a steering wheel, and/or a cruise-control device, among others.

The controller 20 preferably includes memory devices that include executable code 22 and calibrations 24 for dynamically controlling operation of the powertrain system 10. The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory components in the form of memory and storage devices that can be read only, programmable read only, random access, hard drive, and/or other devices. The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, e.g., the communication bus 11, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form that is employed by the controller 20. A parameter is defined as a measurable quantity that represents a physical property of a device or other element that is discernible using one or more sensors and/or a physical model. A parameter can have a discrete value, e.g., either "1" or "0", or can be infinitely variable in value.

The controller 20 is an element of an on-vehicle computing system, and can execute a computer algorithm, machine executable code, non-transitory computer-readable medium, or software instructions that have been programmed into a suitable programmable logic devices) of the vehicle.

Figure 2:
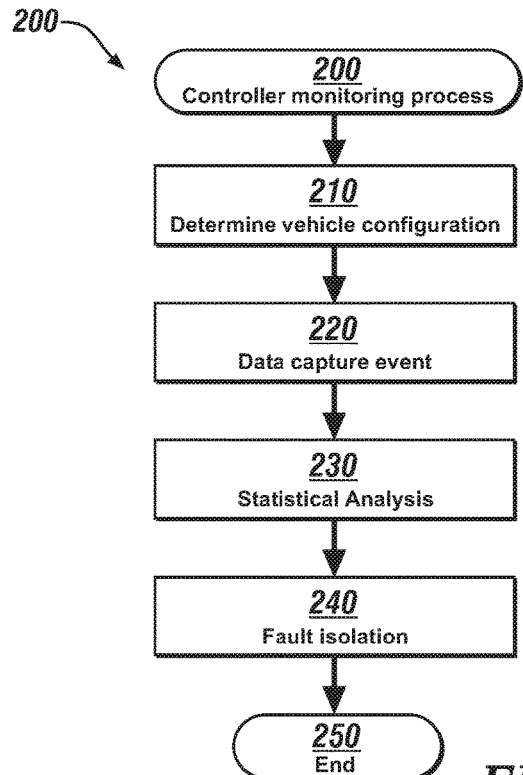
FIG. 2 schematically shows a controller monitoring process for monitoring a controller in a vehicle, in accordance with the disclosure.

FIG. 2 schematically shows a controller monitoring process 200 for monitoring a controller in a vehicle, e.g., the controller 20 of vehicle 100. The controller monitoring process 200 is executed to detect and, when necessary, isolate a fault that has occurred therein. The purpose of the controller monitoring process 200 is to isolate a fault F to either a hardware fault or a software fault in the controller 20 based upon monitored or observed vehicle states that can be associated with one or a plurality of conditions C. The controller monitoring process 200 may be an element of a vehicle computing system that can be implemented through a computer algorithm, machine executable code, non-transitory computer-readable medium, or software instructions programmed into a suitable programmable logic device(s) of the vehicle. Alternatively, or in addition, the controller monitoring process 200 can be executed in the cloud computing environment 60. Alternatively, or in addition, the controller monitoring process 200 can be executed at the vehicle service center 50. The teachings may be described herein in terms of functional and/or logical block components and/or various processing steps. It should be realized that such block components may be composed of hardware, software, and/or firmware components that have been configured to perform the specified functions.

The controller monitoring process 200 described herein advantageously relies upon differences in conditions that correlate with different hardware and software faults, i.e., fault signatures. The concept is that when a condition C is correlated with a fault F, then there shall be a statistically significant difference between the probability distributions of the condition C between baseline operation and fault operation. As described herein, the conditions correlated to various controller faults can be identified through condition monitoring and statistical analysis. Based on the correlated conditions, controller hardware and software faults can be isolated. Table 1 provides details that can be employed in this analysis.

Table 1

| Fault/Condition (F)/(C) | SW Execution | SW Version | Environment | HW Version | Assembly plant | In-use |
|---|---|---|---|---|---|---|
| SW Fault | X | X | — | — | — | — |
| HW Fault Design/Mfg | — | — | X | X | X | — |
| Service Life | — | — | X | X | — | X |

The faults F can be categorized as software faults (SW Fault) and hardware faults (HW Fault), wherein the hardware faults can include a fault associated with controller design or manufacturing (Design/Mfg) and a fault associated with in-use operation and service life (Service Life). The conditions C can be categorized into a software execution condition (SW Execution), a software version condition (SW version), an environment condition, a hardware version condition (HW version), an assembly plant condition, and an in-use condition. The 'X' indicates which category of faults F correlates with a specific category of the conditions C.

Operating states associated with software execution conditions can include, by way of non-limiting examples, a software mode change, module triggering, function requests, etc. Operating states associated with environmental conditions include, by way of non-limiting examples, temperature, voltage, vibration, humidity, etc. Operating states associated with in-use conditions relate to usage history, and include, by way of non-limiting examples, thermal cycles, voltage cycles, accumulated vibration, accumulated humidity, travel distance, operating time, etc.

Controller fault reports and related parameters can include reset occurrence, e.g., reset type, wakeup source, reset frequency and counter. Controller fault reports and related parameters can include activities related to shutdown prevention, including source and frequency. Controller fault reports and related parameters can include aliveness monitoring, e.g., a failure counter. Controller fault reports and related parameters can include software module mode monitoring. Controller fault reports and related parameters can include memory health monitoring, e.g., integrity failures, memory protection errors, and/or stack overflow. Controller fault reports and related parameters can include an error protection hook in its operating system. Controller fault reports and related parameters can include diagnostic session monitoring such as frequent failed reprogramming, DTC clearing request, and/or a seed/key access failure. Controller fault reports and related parameters can include communication error monitoring such as E2E (end to end) fault, a security fault, bus flooding, and a communication rolling counter. Controller fault reports and related parameters can include a signal availability error, e.g., deadline monitoring. Controller fault reports and related parameters can include a software watchdog manager SoH (state of health). Controller fault reports and related parameters can include general error monitoring such as occurrence of errors without setting DTCs, and occurrence of DTCs that are detected through a diagnostic event manager.

The controller monitoring process 200 can execute in response to detection or occurrence of a fault associated with the controller 10. The controller monitoring process 200 can also periodically execute absent a fault, as described.

The controller monitoring process 200 includes determining configuration information associated with the vehicle (Step 210), as described herein. A data capture event to capture vehicle operating states associated with the conditions C is executed (Step 220), as described in detail with reference to FIG. 3. Statistical analysis is executed to correlate a fault with the vehicle operating states associated with one of the conditions and employing the configuration information associated with the vehicle (Step 230), as described in detail with reference to FIG. 4. A fault in the controller 20 can be isolated to either a hardware fault or a software fault based upon the statistical analysis (Step 240), as described in detail with reference to FIG. 5. Execution of an iteration ends thereafter (Step 250).

Configuration information associated with the vehicle 100 (Step 210) includes vehicle make, model, model year, vehicle identification number (VIN), vehicle assembly plant location, vehicle assembly date and time, manufacturing serial number for the controller 20, software release level for the controller 20, calibration release level for the controller 20, in-field software release and calibration release updates related to the controller 20, and other pertinent information.

Figure 3:
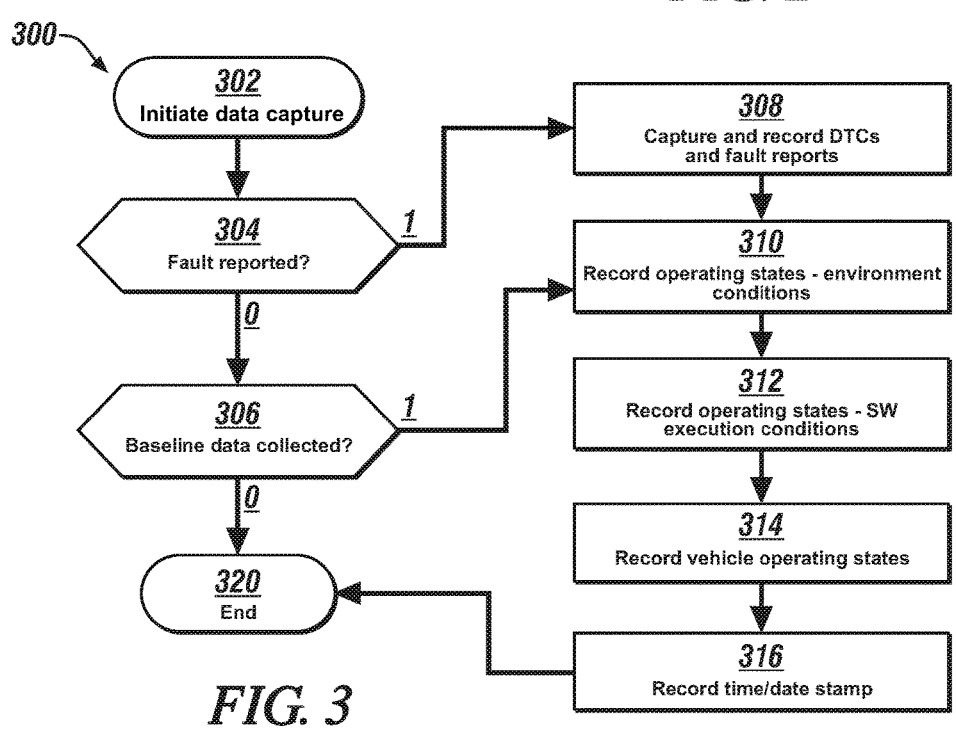
FIG. 3 schematically shows a data capture event associated with monitoring vehicle operating states, in accordance with the disclosure.

FIG. 3 schematically shows a data capture event 300 associated with vehicle operating states, i.e., Step 220 of FIG. 2. Table 2 is provided as a key wherein the numerically labeled blocks and the corresponding functions are set forth as follows.

TABLE 2

| BLOCK | BLOCK CONTENTS |
|---|---|
| 302 | Initiate data capture event |
| 304 | Has a fault reported? |
| 306 | Collect baseline data? |
| 308 | Capture and record DTCs and fault reports |
| 310 | Record operating states associated with environment conditions |
| 312 | Record operating states associated with SW execution conditions |
| 314 | Record vehicle operating states |
| 316 | Record time/date stamp |
| 320 | End |

Execution of the data capture event 300 may proceed as follows. The steps may be executed in a suitable order, and are not limited to the order described with reference to FIG. 3. The data capture event is initiated either periodically or in response to an event (302), and includes determining whether a fault has been reported to the controller 20 or by the controller 20 (304). When a fault has been reported (304)(1), any related diagnostic trouble codes (DTCs) and associated fault reports are captured and recorded in a memory device of the controller 10, or elsewhere (308). Associated fault reports can include freeze-frame events.

When no fault has been reported (304)(0), it may be an indication that there is a need for a periodic capture of baseline data (306), and if so, such baseline data is captured (306)(1).

The capture of data includes recording operating states associated with environmental conditions (310), which preferably include ambient temperature, humidity, elevation/ pressure, voltage levels, vibration levels, precipitation, and longitude/latitude coordinates.

The capture of data includes recording operating states associated with software execution conditions (312), which preferably include identifying presence or occurrence of events such as mode changes, module triggering events, e.g., power-on or power-off events, and function requests.

The capture of data includes recording vehicle operating states (314), which preferably include vehicle odometer, vehicle speed, powertrain operating mode, such as hybrid or electric-vehicle, transmission gear state, steering wheel angle, accelerator pedal position, brake pedal position, cruise control setpoint, etc.

The capture of data includes recording a time/date stamp that preferably includes day, date, hour, minute and second operation states (316).

When all of the above data capture is completed, this iteration of the routine 300 ends (320).

Figure 4:
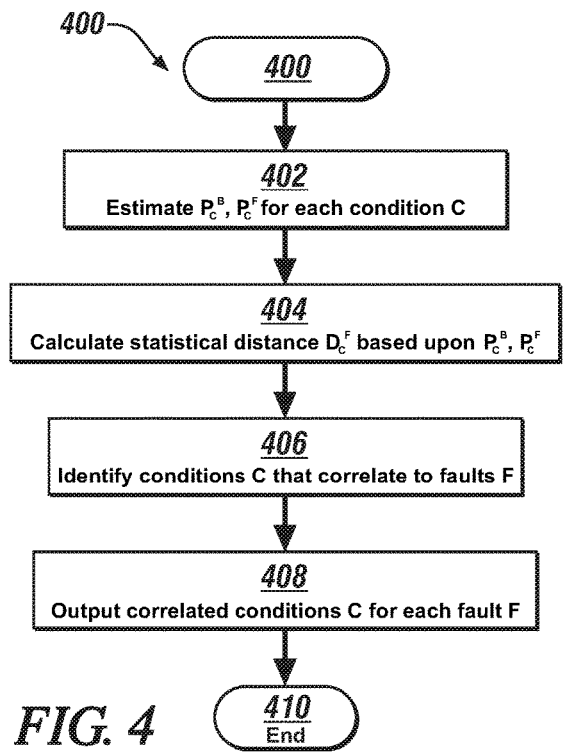
FIG. 4 schematically shows a statistical analysis process for correlating a fault with vehicle operating states, in accordance with the disclosure.

FIG. 4 schematically shows a statistical analysis process 400 to correlate a fault with the vehicle operating states associated with the conditions C, i.e., step 230 of FIG. 2.

Table 3 is provided as a key wherein the numerically labeled blocks and the corresponding functions are set forth as follows.

TABLE 3

| BLOCK | BLOCK CONTENTS |
|---|---|
| 402 | Estimate $P_C^B$, $P_C^F$ for each condition C |
| 404 | Calculate statistical distance $D_C^F$ based upon $P_C^B$, $P_C^F$ |
| 406 | Identify set of conditions C that correlate to each of a plurality of faults F |
| 408 | Output set of correlated conditions C for each fault F |
| 410 | End |

Execution of the statistical analysis process 400 may proceed as follows. Baseline and fault probability distributions $P_C^B$, $P_C^F$ are estimated for each condition C (404). The baseline probability distribution $P_C^B$ represents an estimated probability distribution associated with condition C for baseline operation, i.e., when there is no fault in the system. The fault probability distribution $P_C^F$ represents an estimated probability distribution associated with condition C when there is a fault F in the system. There can be a plurality of conditions C and a plurality of faults F. In the case of discrete probability distribution, it can be determined employing a maximum likelihood estimation (MLE). MLE is a statistical technique for estimating model parameters that determines what model parameters are most likely to characterize a given set of data, employing a predetermined executable model. In the case of continuous probability distribution, a Kernel Density Estimation method can be used to estimate the probability density function. Kernel density estimates are closely related to histograms, but can be endowed with properties such as smoothness or continuity by using a suitable kernel.

A statistical distance $D_C^F$ can be calculated based upon the baseline and fault probability distributions $P_C^B$, $P_C^F$ (404), employing a suitable analytical technique such as a Kullback-Leibler (KL) divergence. The statistical distance $D_C^F$ can be denoted as a correlation coefficient for the condition C and fault F. As such, there is an increased correlation between condition C and fault F with an increase in the statistical distance $D_C^F$.

A Kullback-Leibler (KL) divergence can be expressed as follows:

$$D_{KL}(P \| Q) = \sum_i P(i) \log \frac{P(i)}{Q(i)}.$$

wherein $D_{KL}$ (P∥Q) represents the statistical distance between the distributions P and Q;

P(i) represents the fault probability distribution; and

Q(i) represents the baseline probability distribution.

A subset of the conditions C that correlate with each of the plurality of faults F can be identified (406), employing either a threshold method or a data-clustering approach based upon the correlation coefficients.

The controller monitoring process 200 described herein advantageously relies upon differences in conditions that correlate with different hardware and software faults, i.e., fault signatures. When a condition C is correlated with a fault F, then there shall be a statistically significant difference between the probability distributions of the condition C between baseline operation and fault operation. A set of correlated conditions C for each fault F can be generated and captured for future use (408), and this iteration of the statistical analysis process 400 can end (410).

Figure 5:
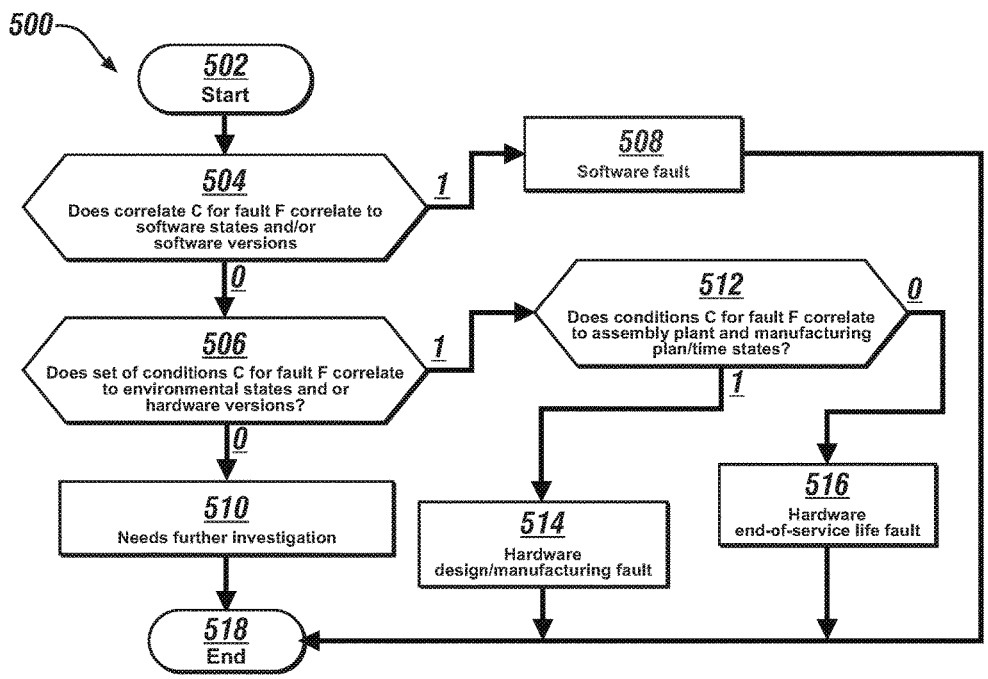
FIG. 5 schematically shows a fault isolation process to isolate a fault in the controller to either a hardware fault or a software fault based upon the set of conditions for each fault that is generated, in accordance with the disclosure.

A fault in the controller can be isolated to either a hardware fault or a software fault based upon the statistical analysis (Step 240), as described in detail with reference to FIG. 5 and Table 1. FIG. 5 schematically shows a fault isolation process 500 to isolate a fault in the controller to either a hardware fault or a software fault based upon the set of conditions C for each fault F that is generated and captured for future use by the statistical analysis process 400. Table 4 is provided as a key wherein the numerically labeled blocks and the corresponding functions are set forth as follows.

TABLE 4

| BLOCK | BLOCK CONTENTS |
|---|---|
| 502 | Start |
| 504 | Does set of conditions C for fault F correlate to software states and/or software versions but not environmental states? |
| 506 | Does set of conditions C for fault F correlate to environmental states and or hardware versions, but not with software states and/or versions? |
| 508 | Output software fault |
| 510 | Output needs further investigation |
| 512 | Does set of conditions C for fault F correlate to assembly plant and manufacturing plan/time states, but not with in-use history? |
| 514 | Output hardware design/manufacturing fault |
| 516 | Output hardware end-of-service life fault |
| 518 | End |

Execution of the fault isolation process 500 may proceed as follows to isolate a fault associated with the controller to one of a hardware fault or a software fault based upon the statistical analysis correlating a fault with the vehicle operating states and the configuration information associated with the vehicle, including the set of conditions C for each fault F that was generated and captured, as described with reference to step 408 of FIG. 4. The fault isolation process 500 evaluates whether the set of correlated conditions C correlated to fault F are related to software states and/or software versions but not environmental states (504), and if so (504)(1), generates an output indicating a software fault (508), and this iteration ends (518). Otherwise (504)(0), the fault isolation process 500 evaluates whether the set of conditions C correlated to fault F are related to environmental states and or hardware versions, but not with software states and/or versions (506). If not (506)(0), an output is generated indicating a need for further investigation (410). If so (506)(1), the fault isolation process 500 evaluates whether the set of conditions C correlated to fault F are related to assembly plant and manufacturing plan/time states, but not with in-use history (512). If so (512)(1), an output is generated indicating a fault associated with hardware design and/or manufacturing (514) and this iteration ends (518). If not (512)(0), an output is generated indicating a fault associated with service life of the controller (516) and this iteration ends (518).

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in a tangible medium of expression having computer-usable program code embodied in the medium.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by single-purpose hardware-based systems that perform the specified functions or acts, or combinations of single-purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for monitoring a controller of a vehicle, the method comprising:
    detecting occurrence of a fault associated with operation of the controller in the vehicle;
    determining configuration information associated with the vehicle;
    determining vehicle operating states, wherein the vehicle operating states include software execution states including a software mode change, a module triggering event including a power-on or a power-off event, and a function request;
    correlating, via a second controller, the fault with the vehicle operating states and the configuration information associated with the vehicle;
    isolating, via the second controller, the fault to one of a hardware fault or a software fault associated with the controller based upon the correlation and the configuration information associated with the vehicle; and
    generating, via the second controller, an output indicating the fault that is isolated to one of the hardware fault or the software fault;
    wherein the second controller is disposed off-vehicle.

2. The method of claim 1, wherein determining the configuration information includes determining a controller hardware configuration, a software update level, controller manufacturing site information, vehicle assembly site information, and a vehicle assembly date.

3. The method of claim 1, wherein determining vehicle operating states further comprises determining occurrence of diagnostic trouble codes and associated fault reports.

4. The method of claim 1, wherein determining vehicle operating states further comprises determining environmental states.

5. The method of claim 4, wherein the environmental states include temperature, vibration, humidity, precipitation and geographic location.

6. The method of claim 1, wherein determining the vehicle operating states further comprises determining at least one of odometer, speed, power mode, engine running status, steering wheel angle, accelerator pedal position, and brake pedal position.

7. The method of claim 1, wherein correlating the fault with the vehicle operating states and the configuration information associated with the vehicle comprises:
    determining baseline and fault probability distributions for each of the plurality of conditions; and
    determining a correlation coefficient based upon the baseline and fault probability distributions.

8. The method of claim 7, wherein determining baseline and fault probability distributions comprises executing a discrete probability function to determine the baseline and fault probability distributions.

9. A system including a controller operatively connected to a powertrain system of a vehicle and including a memory device including executable code and a calibration, and a remote controller configured to:
    detect occurrence of a fault associated with operation of the controller in the vehicle;
    determine configuration information associated with the vehicle;
    determine vehicle operating states associated with a plurality of conditions associated with the controller, wherein the conditions associated with the controller include software execution, software version, controller environment, hardware version, assembly plant, and in-use;
    correlate the fault with the vehicle operating states associated with the plurality of conditions and the configuration information associated with the vehicle;
    isolate, via the remote controller, the fault in the controller to one of a hardware fault and a software fault based upon the correlation and the configuration information associated with the vehicle; and
    generate, via the remote controller, an output indicating the fault that is isolated to one of the hardware fault and the software fault.

10. The system of claim 9, wherein the remote controller configured to correlate the fault with the vehicle operating states associated with the plurality of conditions and the configuration information associated with the vehicle is configured to:
   determine baseline and fault probability distributions for each of the plurality of conditions; and
   determine a correlation coefficient for each of the plurality of conditions based upon the baseline and fault probability distributions.

11. The system of claim 10, comprising the remote controller configured to execute a discrete probability function to determine the baseline and fault probability distributions.

12. The system of claim 9, wherein the configuration information includes a controller hardware configuration, a software update level, controller manufacturing site information, vehicle assembly site information, and a vehicle assembly date.

13. The system of claim 9, wherein the vehicle operating states further comprise occurrence of diagnostic trouble codes and associated fault reports.

14. The system of claim 9, wherein the vehicle operating states further comprise environmental conditions including temperature, vibration, humidity, precipitation and geographic location.

15. The system of claim 9, wherein the vehicle operating states further comprise software execution conditions.

16. The system of claim 15, wherein the software execution conditions include one of a presence or occurrence of a mode change, a module triggering event including power-on or power-off events, and a function request.

17. The system of claim 9, wherein the vehicle operating states further comprise at least one of odometer, speed, power mode, engine running status, steering wheel angle, accelerator pedal position, and brake pedal position.

* * * * *